(12) United States Patent
Pastoor et al.

(10) Patent No.: US 11,122,771 B2
(45) Date of Patent: Sep. 21, 2021

(54) FEED-MIXING WAGON

(71) Applicant: LELY PATENT N.V., Maassluis (NL)

(72) Inventors: Jan Lambertus Pastoor, Maassluis (NL); Jan Martinus Van Kuilenburg, Maassluis (NL); Karel Van Den Berg, Maassluis (NL); Howard Sie, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 15/151,870

(22) Filed: May 11, 2016

(65) Prior Publication Data
US 2016/0255804 A1 Sep. 8, 2016

Related U.S. Application Data

(62) Division of application No. 14/390,881, filed as application No. PCT/NL2013/050180 on Mar. 14, 2013, now abandoned.

(30) Foreign Application Priority Data

Apr. 20, 2012 (NL) ...................................... 2008677

(51) Int. Cl.
*A01K 5/00* (2006.01)
*B01F 7/24* (2006.01)
(Continued)

(52) U.S. Cl.
CPC ............ *A01K 5/004* (2013.01); *B01F 7/0025* (2013.01); *B01F 7/00616* (2013.01);
(Continued)

(58) Field of Classification Search
CPC ..... A02K 5/004; B01F 7/247; B01F 7/00616; B01F 13/0032; B01F 13/004; B01F 7/245; B01F 2215/0024
(Continued)

(56) References Cited

U.S. PATENT DOCUMENTS

| 5,294,064 A | 3/1994 | Faccia | |
| 5,590,963 A * | 1/1997 | Schuler | B01F 7/00208 366/302 |
| 5,601,362 A * | 2/1997 | Schuler | B01F 13/0035 366/309 |

(Continued)

FOREIGN PATENT DOCUMENTS

| DE | 20 2004 014 031 U1 | 1/2006 |
| EP | 0 527 428 A2 | 2/1993 |
| EP | 1 417 999 A2 | 5/2004 |

OTHER PUBLICATIONS

International Search Report dated Jul. 26, 2013 in PCT/NL2013/050180 filed Mar. 14, 2013.

*Primary Examiner* — Adam J Eiseman
*Assistant Examiner* — Mohammed S. Alawadi
(74) *Attorney, Agent, or Firm* — Oblon, McClelland, Maier & Neustadt, L.L.P.

(57) ABSTRACT

The invention provides a feed-mixing wagon (1) for animal feed, comprising a frame with a drive, a container (4) with a continuous wall (5) with a feed-unload opening, a feed auger which is arranged in the container for mixing and cutting animal feed and comprising an auger shaft (8) and an auger body (10) which is arranged around it in a spiral which has several blades, wherein the blades comprise at least one blade (11) of a first, long type and at least one blade (12) of a second, short type, and wherein at least one blade of the short type is situated closer to the bottom (6) than at least one blade of the long type. As a result of the various blades in the described configuration, the cutting and mixing behaviour can be adjusted in an optimum way.

20 Claims, 2 Drawing Sheets

Figure 1:
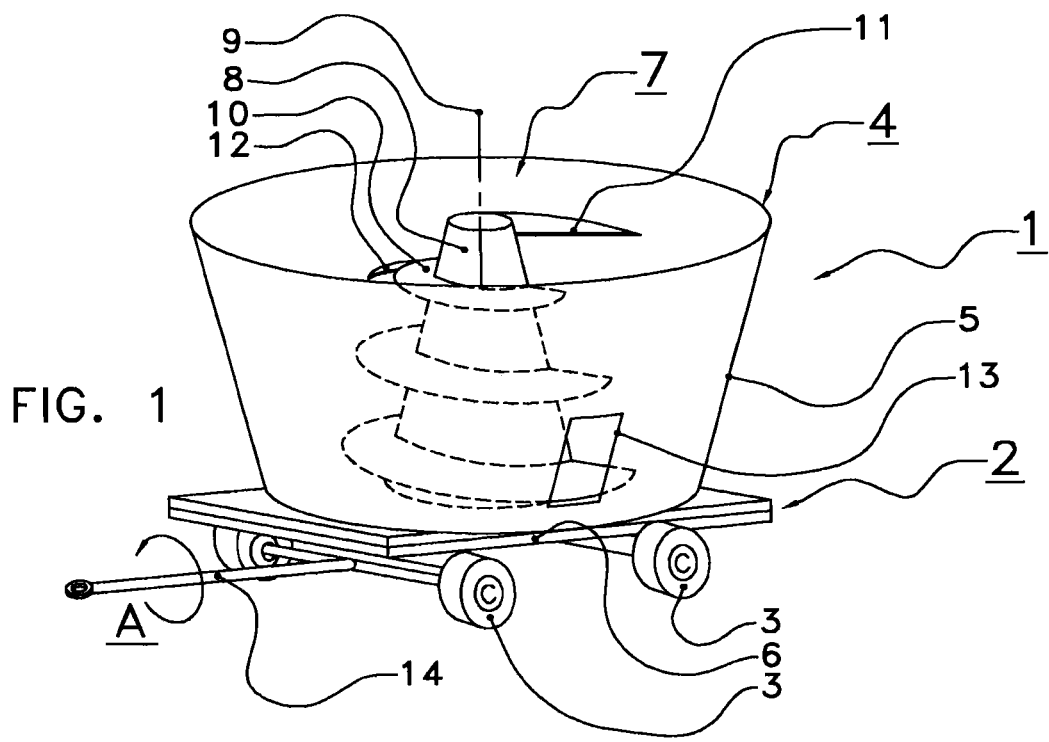

(51) Int. Cl.
  *B01F 7/00* (2006.01)
  *B01F 13/00* (2006.01)
  *B01F 7/16* (2006.01)
  *B01F 15/00* (2006.01)
(52) U.S. Cl.
  CPC .............. *B01F 7/162* (2013.01); *B01F 7/245* (2013.01); *B01F 7/247* (2013.01); *B01F 13/004* (2013.01); *B01F 13/0032* (2013.01); *B01F 15/00448* (2013.01); *B01F 15/00538* (2013.01); *B01F 2015/00597* (2013.01); *B01F 2215/0008* (2013.01); *B01F 2215/0024* (2013.01)
(58) Field of Classification Search
  USPC .............. 241/101.74, 101.761, 605; 366/314
  See application file for complete search history.

(56) References Cited

U.S. PATENT DOCUMENTS

| | | | | |
|---|---|---|---|---|
| 5,615,839 A * | 4/1997 | Hartwig | ................ | A01F 29/005 241/260.1 |
| 5,647,665 A * | 7/1997 | Schuler | ............... | B01F 7/00208 366/196 |
| 5,823,449 A | 10/1998 | Kooima | | |
| 5,863,122 A * | 1/1999 | Tamminga | ............. | A01K 5/004 366/314 |
| 6,328,465 B1 * | 12/2001 | Tamminga | ............. | A01K 5/004 241/260.1 |
| 6,467,945 B1 * | 10/2002 | Albright | ................ | A01K 5/004 241/101.761 |
| 6,817,752 B2 * | 11/2004 | Tolle | ....................... | B01F 7/247 241/260.1 |
| 6,945,485 B1 * | 9/2005 | Douglas | ................ | A01K 5/004 241/101.761 |
| 7,874,720 B2 * | 1/2011 | Hendriks | ............... | A01K 5/001 241/101.761 |
| 7,938,575 B2 * | 5/2011 | Liet | ........................ | A01K 5/004 241/101.76 |
| 2003/0223308 A1 * | 12/2003 | Knight | .................. | B01F 13/105 366/314 |
| 2004/0090860 A1 * | 5/2004 | Tamminga | ............. | A01K 5/004 366/192 |
| 2005/0105390 A1 * | 5/2005 | Albright | ............. | B01F 13/0035 366/314 |
| 2005/0169103 A1 * | 8/2005 | Joranlien | ............ | A01K 5/004 366/314 |
| 2006/0126430 A1 * | 6/2006 | Cicci | ...................... | B01F 7/241 366/314 |
| 2007/0274151 A1 * | 11/2007 | Albright | ................ | A01K 5/004 366/314 |
| 2010/0039885 A1 * | 2/2010 | Baker | .................... | B01F 7/245 366/195 |
| 2010/0108794 A1 * | 5/2010 | Tamminga | ............. | A01K 5/002 241/260.1 |
| 2010/0263345 A1 * | 10/2010 | Goldenberg | ........... | A01K 5/004 56/10.2 R |
| 2011/0121114 A1 * | 5/2011 | Neier | .................. | B01F 13/1044 241/101.8 |
| 2011/0284672 A1 * | 11/2011 | Baker | .................... | A01K 5/004 241/25 |
| 2012/0008457 A1 * | 1/2012 | Neier | ................ | B01F 15/00545 366/190 |
| 2012/0182830 A1 * | 7/2012 | Pellman | .................. | B01F 7/245 366/314 |
| 2013/0058189 A1 * | 3/2013 | Liet | ........................ | A01K 5/004 366/302 |

* cited by examiner

FEED-MIXING WAGON

This application is a divisional application of U.S. Ser. No. 14/390,881 filed Oct. 6, 2014, pending, which is a 371 application of international PCT/NL2013/050180 filed Mar. 14, 2013 and claims the benefit of Netherlands Application 2008677 filed Apr. 20, 2012. The contents of each of these applications are incorporated herein by reference in their entirety.

The invention relates to a feed-mixing wagon for mixing and unloading animal feed, and comprising a frame with a drive, a container which is arranged on the frame and is open at the top, with a bottom and a continuous wall arranged thereon and a closable feed-unload opening in the wall, at least one feed auger which is arranged in the container and is rotatably drivable in a direction of rotation about a substantially vertical axis of rotation, which feed auger is arranged to mix and cut animal feed which has been introduced into the container and comprising an auger shaft and an auger threaded body which is arranged around it in a spiral and has an outer edge, on which outer edge a plurality of blades are provided.

Such feed-mixing wagons are known in the prior art. They are used in particular to mix, cut and unload silage and other animal feed to animals. To this end, auger(s) with one or more blades are provided in the container.

In practice, it has been found that the mixing and cutting behaviour of such feed-mixing wagons is not always satisfactory. Often, the required power in particular is relatively high, which reveals itself in a relatively high fuel consumption or a longer cutting and mixing time if the power or fuel consumption is limited.

It is an object of the present invention to provide a feed-mixing wagon of the kind mentioned in the introduction which does not suffer from the abovementioned drawbacks or at least only to a lesser degree.

The invention achieves this object by means of a feed-mixing wagon according to Claim 1, in particular a feed-mixing wagon for mixing and unloading animal feed, and comprising a frame with a drive, a container which is arranged on the frame and is open at the top, with a bottom and a continuous wall arranged thereon and a closable feed-unload opening in the wall, at least one feed auger which is arranged in the container and is rotatably drivable in a direction of rotation about a substantially vertical axis of rotation, which feed auger is arranged to mix and cut animal feed which has been introduced into the container and comprising an auger shaft and an auger threaded body which is arranged around it in a spiral and has an outer edge, on which outer edge a plurality of blades are provided, wherein the blades comprise at least one blade of a first, long type and at least one blade of a second, short type, wherein the long type is longer than the short type, and wherein at least one blade of the short type is situated closer to the bottom than at least one blade of the long type.

With such a feed-mixing wagon, the blade configuration can be adapted in an optimum way on the container in particular. In practice, it has been found advantageous not to use the same size of blade in all instances. With vertical augers, for example, it is advantageous if the container narrows towards the bottom, which is also a particular embodiment. With such containers, the feed in the container will be compacted more towards the bottom due to the weight of the feed situated above it. As a result thereof, it is easier to cut and long blades would result in much more resistance, leading to an increase in the fuel consumption. In addition, the containers (in this case) widen towards the top.

As a result thereof, the feed which is picked up by the auger at the bottom will mix more readily in the larger, wider space at the top and drop down again. In this large, wide space, the density of the feed is lower and the blades may, for example, be larger. Thus, it is not only possible to cut in a larger partial volume, but cutting also does not particularly require much more fuel or power. All this will be explained below in more detail, partly by means of particular embodiments which are mentioned, for example, in the dependent claims.

For example, a blade of the first type is provided as top blade on the outer edge. However, the possibility of using a short blade as top blade is not excluded, but, as has been described above, it is advantageous with regard to the ratio of cutting power and required motor power if the blade or the blades at the top is/are longer than the blade or the blades at the bottom. An embodiment thereof is one in which the top blade is of the first type. It should be noted here that, in this application, the length of a blade is understood to mean, for example, the physical length of the part, but in alternative embodiments also the effective length, or the length over which the blade extends from the outer edge of the auger body. The reason for this is that it is possible that blades of the same length have been provided which are, however, either fitted radially further or less far towards the inside and/or at different angles and are to this end advantageously adjustable, so that the operative length of the blades may in those cases also be regarded as being different. However, the length of the effective cutting edge of the blades will be the same in those cases. Thus, however, in the context of the present invention, the length is in particular understood to be the total length of the blade part, so that in particular the total length of the at least one short blade is smaller than the total length of the at least one long blade. For example, the short blade is approximately 20 cm and the long blade approximately 40 cm long, but other lengths and ratios are not excluded.

In embodiments, exactly two blades of the first type are provided on the outer edge. This embodiment has the advantage of having a very favourable ratio between required motor power, cutting power and material costs. The reason for this is that it has been found that with 3 or more long blades, it is still possible for the increased yield to rise slightly, and therefore these embodiments can certainly not be excluded, but the resistance in particular and consequently the required motor power rises more. In addition, the longer, heavier blades require more material, are heavier, and are also subjected to greater loads due to the greater resistance, which may cause them to break more rapidly. In a practical case, it was found that, if a second long blade was added, the yield (the cutting power, which can be seen as an associated shortening of the required cutting time, etc.) increased by ca. 30%, whereas adding a third long blade only resulted in another 5% increased yield.

As has already been mentioned, advantageously one of the blades of the first type is provided as the top blade, advantageously substantially at the top of the auger, that is to say, for example, as the highest operative point of the auger, but in any case in the top 10% of the auger threaded body. In embodiments, one of the two blades of the first type is provided substantially halfway up the feed auger, that is to say at between ⅓ and ⅔ of the height of the auger, more particularly the auger threaded body. With such a positioning of the second long blade, it is possible, at least for the long blades, to provide an optimum cutting action relative to the required power.

Incidentally, it should be noted here that the number of blade types is likewise not particularly limited. For example, three or more types of blades may be provided. However, there are logistical advantages to limiting the number of blade types and it has been found in practice that two blade types suffice for most purposes.

In particular embodiments, at least as many blades of the second type are provided on the outer edge as blades of the first type. In this case, use is made of the fact that these shorter blades can be fitted relatively freely on the feed auger as they offer less resistance than the long blades. In particular, there are more blades of the second type than blades of the first type. As a result thereof, cutting action may be provided at more than, for example, only one or two locations, that is to say by the long blades, without the resistance and thus the required power increasing excessively.

In particular, a first number of the blades of the second type are provided below a bottom blade of the first type, and a second number of the blades of the second type are provided above the bottom blade of the first type, wherein the first number is at least equal to and is preferably larger than the second number. This in fact indicates that the short blades are preferably provided mainly at the bottom, where the greater density of the feed renders the provision of (many) long blades superfluous, thus saving power.

In embodiments, the blades, viewed in vertical projection on the feed auger, are distributed substantially evenly over an outer periphery of the feed auger. More particularly, at least the blades of the first type, viewed in vertical projection on the feed auger, are distributed substantially evenly over the outer periphery of the feed auger. Thus, it is possible to ensure the mixing and cutting behaviour in an optimum way, with as little as possible formation of plugs or other irregularities occurring during rotation of the feed auger. In this case, it is never possible to entirely predict the behaviour, since feed is not a homogenous mass, in particular with a vertical density gradient, but also because the blades will make a different contribution to the torque balance and force balance due to their different lengths. It is nevertheless helpful if at least the different types of blades are arranged (virtually) symmetrically.

Very advantageously, the feed-mixing wagon according to the invention comprises a motor arranged on the frame for rotatably driving the feed auger, wherein the drive of the frame comprises a motor. In particular, the feed-mixing wagon is an autonomous feed-mixing wagon. These embodiments make optimum use of the advantage provided by the use of different blades, namely that the power delivered by the drive of the feed auger can be used in an optimum way. This is due to the fact that if the motor is provided on the feed-mixing wagon itself, the power supply will in particular almost always also be provided on the feed-mixing wagon. In this case, not only is the usable power limited, but the amount of energy which can be used without "refueling" is also limited. More particularly, if the feed-mixing wagon comprises an electrical power store, and the feed auger and the feed-mixing wagon are directly or indirectly driven entirely electrically, optimum efficiency is advantageous, such as according to the invention. However, if the energy is stored in the form of solar cells, fuel, etc., together with an associated motor, energy efficiency is advantageous. Even if the power supply and/or drive of the feed auger and/or the feed-mixing wagon is entirely external, in particular with a feed-mixing wagon pulled by a tractor, energy efficiency is advantageous, since this will result in a lower fuel consumption of said tractor.

It should be noted here, that the term "drive" in this application not only denotes said motor on the feed-mixing wagon itself, but also a coupling for coupling to an external motor, such as in particular to a power take-off of a tractor or other agricultural vehicle. In addition, the feed-mixing wagon is provided with wheels or optionally caterpillar tracks or the like in order to be able to displace it. These may also be driven by an external drive or by a motor which is provided on the feed-mixing wagon. In this case, separate motors may be provided, either one or more for driving the wheels or the like, and for driving the feed auger.

As has already been indicated above, a container which narrows towards the bottom is an advantageous embodiment. However, it is possible for the container not to narrow, that is to say to have substantially vertical side walls. It is also possible for the feed auger itself to narrow towards the top. This may, for example, be achieved by making the auger body/auger threaded body on a cylindrical auger shaft narrow or "shorten" towards the top. Incidentally, this narrowing does not have to be along the entire length, but may, for example, only be provided along a part. Such a cylindrical auger shaft has the advantage that it is easier to provide, for example, a drive and/or motor of the feed auger inside said shaft. However, it may also be the case, and in some cases may be advantageous, if the auger shaft itself narrows and the auger body also narrows along the height thereof, or remains equally wide, or even widens towards the top while the outer periphery remains the same overall. Each of these cases offers excellent mixing behaviour and partly as a result thereof a favourable cutting behaviour of the feed as well.

Another problem which may occur with feed-mixing wagons comprising an auger is that the feed in the container is not reliably picked up by the feed auger. This is obviously very important in order to achieve good mixing behaviour, and consequently cutting behaviour, of the feed.

It is therefore another object of the invention to provide a feed-mixing wagon of the type mentioned in the introduction, in which this behaviour is improved.

The invention therefore also relates to a feed-mixing wagon according to Claim 10, in particular a feed-mixing wagon for mixing and unloading animal feed, and comprising a frame with a drive, a container which is arranged on the frame and is open at the top, with a bottom and a continuous wall arranged thereon and a closable feed-unload opening in the wall, at least one feed auger which is arranged in the container and is rotatably drivable in a direction of rotation about a substantially vertical axis of rotation, which feed auger is arranged to at least mix animal feed which has been introduced into the container and comprising an auger shaft and an auger body which is arranged around it in a spiral and has, viewed in the direction of rotation, a bottom front edge which is situated closest to the bottom during rotation of the feed auger and extends in a substantially horizontal plane, wherein a greatest chord of the bottom front edge extends through the auger body and wherein a line through said chord extends, viewed in the direction of rotation, in front of the axis of rotation.

In the prior art, it is customary to the auger body, which is virtually always defined by a screw thread, i.e. by a (horizontal) radius on the auger shaft which rotates about a shaft at an optionally regular pitch. The bottom end of such an auger threaded body is then also a radius on the auger shaft. Said bottom edge is then always at right angles to the direction of movement of the bottom edge, and is positioned radially to the axis of rotation. As a result thereof, the tipping-up behaviour for feed is not advantageous. According to the invention at least a line runs through the greatest chord of the bottom front edge in front of the axis of rotation.

As a result thereof, said bottom front edge is at a slight angle to the direction of movement and, in fact, feed will be able to slide off slightly towards the outside, which aids a more fluent tipping up, that is to say when tipping the feed onto the auger body. As a result thereof, the mixing behaviour will also be more even.

In this case, it should be noted that the expression "the greatest chord" is understood to mean a line section which extends between the two ends of the bottom front edge. In this case, said bottom front edge does not have to be a(n arch of a) circle, but may, if desired, also have a different curvature or even be straight. The chord does have to run through the auger body, since there will be a hollowing if it does not, and feed will collect precisely in said hollowing during rotation.

In embodiments, the bottom front edge is continuously curved, in particular with a local radius of curvature directed radially, that is to say outwards, towards the auger body. In this embodiment, there is a more gradual transition of the feed to the auger body, so that the tipping up also occurs in a more gradual way. In this case, the radius of curvature may remain the same or change, but preferably does not change in sign, that is to say direction, anywhere in order to prevent the above-described formation of a cavity.

In particular, the feed auger comprises a transition which partly extends around the auger shaft, between the bottom front edge and the auger body, which transition in particular comprises an edge face which stands at an oblique angle with the horizontal as well as an adjacent horizontal face portion which extends between the edge face and an end radius of the auger body. In this case, the auger body is arranged as an auger helix body, that is to say as having a helical shape. Said screw thread ends at the end radius and there passes into the rest of the auger body, in this case therefore the transition, which extends further to the bottom front edge. Said embodiment ensures an uninterrupted auger body from the bottom front edge to the top with a smoother feed tipping-up behaviour according to the invention, which embodiment also offers the freedom of shaping said front edge to one's own liking within the scope of the present invention. The reason for this is that, in the prior art, the front edge runs directly along the end radius and there is no possibility for another bottom front edge. Such an embodiment according to the present invention also functions as a scraper, partly because of the edge face standing at an angle which extends even closer to the bottom of the container and ensures in an optimum way that all the feed is caught, while in addition ensuring that no or at least little feed remains behind between the auger body and the bottom. After all, said feed would not only not be mixed, but would, in addition, also cause unnecessary resistance. In the prior art, scrapers are known per se. It should be noted here that it is also possible to provide even more scrapers on the auger shaft in order to achieve an even better mixing behaviour. However, as far as is known, they were not combined with the auger body, as is the case with this embodiment of the present invention.

Furthermore, it should be noted here that, just as with the embodiments according to Claims 1-9, the drive may comprise wheels and/or caterpillar tracks, as well as a motor or a coupling to an external motor. More generally, it should be noted here that each of the embodiments according to Claims 1-9 and the associated description can also be applied to the feed-mixing wagons according to the second aspect of the invention, associated with Claims 10-12 and the associated description. Furthermore, it is also possible in each of the embodiments to arrange two or more vertical feed augers in the container, even though this will usually mean that the feed-mixing wagon will become larger overall, and also that the required motor will have to provide more power.

Figure 2:
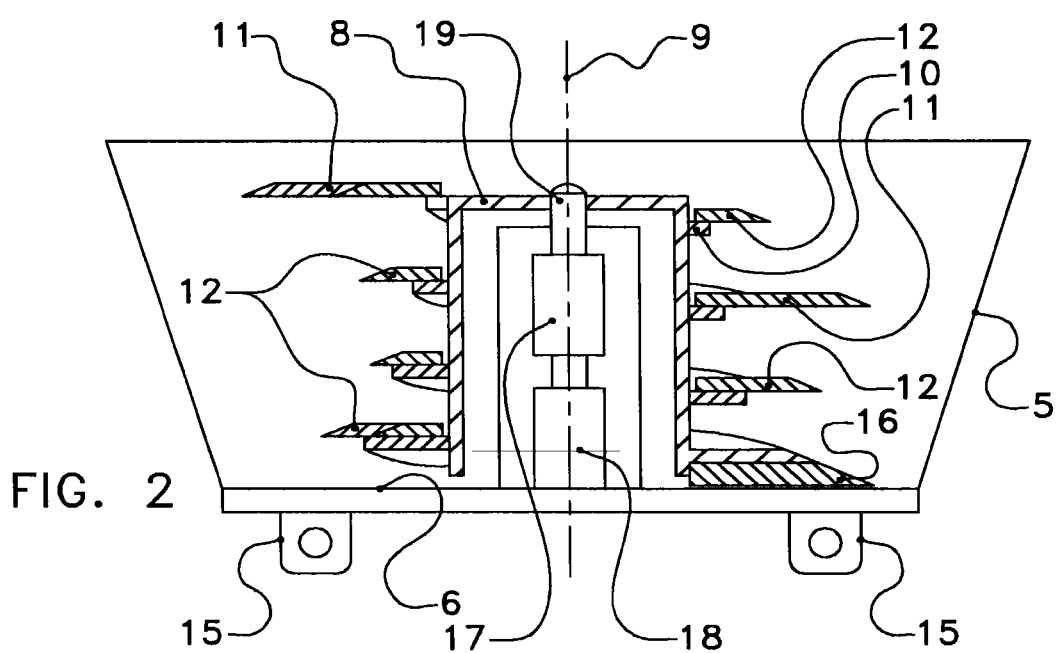
Figure 3:
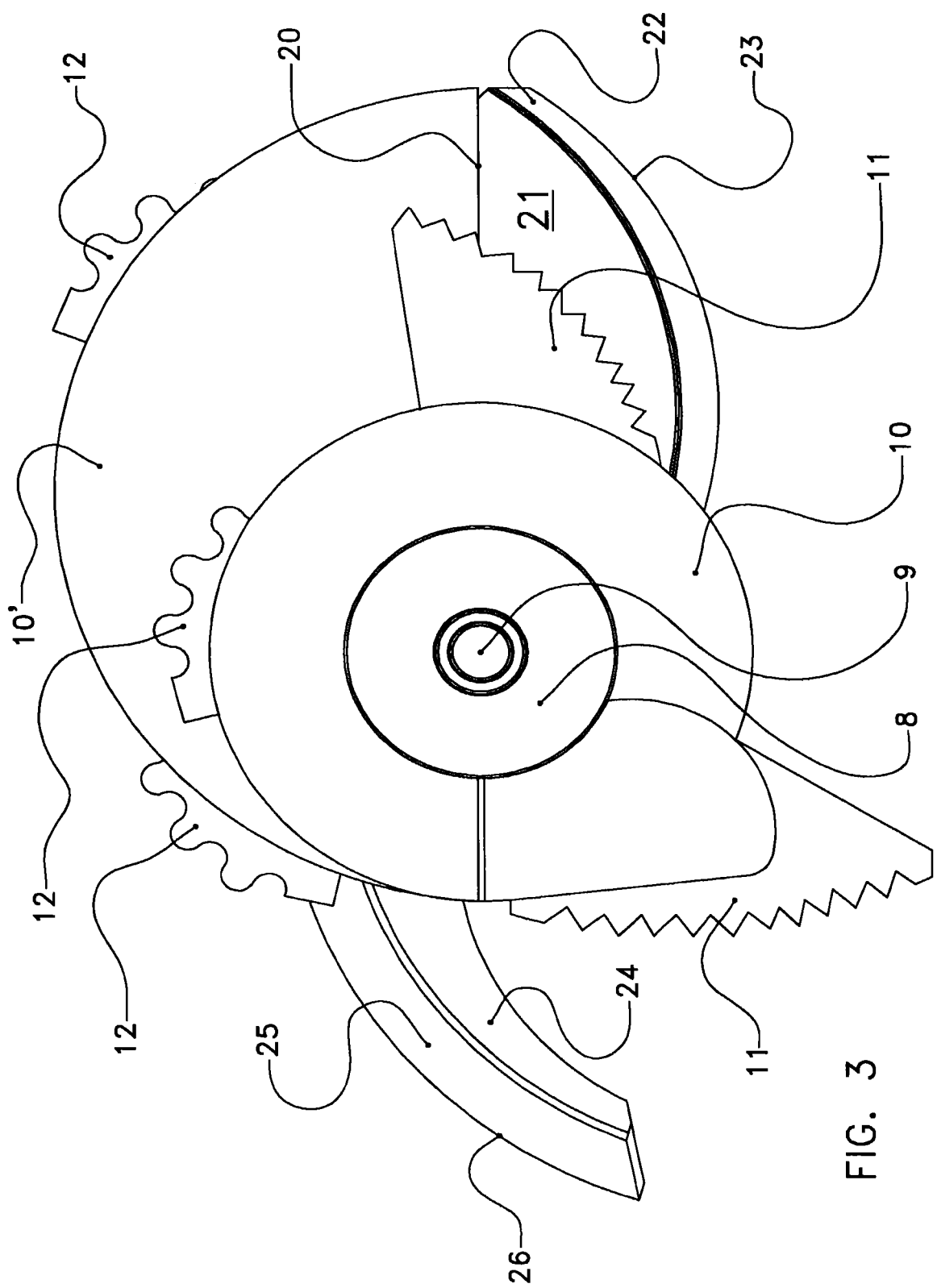

The invention will now be explained in more detail with reference to the drawing which shows a few non-limiting embodiments, and in which:

FIG. 1 diagrammatically shows a perspective view of a first embodiment of a feed-mixing wagon according to the invention, FIG. 2 diagrammatically shows a sectional view of another feed-mixing wagon 1, and FIG. 3 diagrammatically shows a top view of a feed auger according to an embodiment of the invention.

The feed-mixing wagon 1 comprises a frame 2 with wheels 3, as well as a container 4 with a side wall 5 and a bottom 6. A feed auger 7 with an auger shaft 8 is arranged inside the container 4 and is able to rotate about an axis of rotation 9. Arranged on the auger shaft 8 is an auger body 10 comprising a long blade 11 and a short blade 12. Reference numeral 13 denotes a feed-unload opening and reference numeral 14 denotes a power take-off coupling.

The feed-mixing wagon 1 can be used to mix and cut, for example, silage for dairy animals which cut and mixed feed can then be unloaded via the closable feed-unload opening via a closure (not shown here). By means of the power take-off coupling 14, which contains a drive shaft which is rotatable in the direction of arrow A, the feed wagon 1 can be coupled to, for example, a tractor.

Here, the illustrated feed auger 7 with the auger body 10 comprises two different blades, namely a long blade 11 at the top and a short blade 12 situated underneath. According to the invention, such a configuration with different blades offers advantages when cutting feed in the container 4. Said container 4 has a continuous side wall 5 which narrows towards the bottom, which may offer advantages when mixing the feed.

FIG. 2 diagrammatically shows a sectional view of another feed-mixing wagon 1. As is the case in the entire drawing, similar parts are denoted by the same reference numerals. Furthermore, axial holders 15 are shown here for the shafts of the wheels 3 (not shown here), as well as a drive line which comprises a drive 17, a battery 18 and a coupling piece 19. Finally, reference numeral 16 denotes a scraping part.

The diagrammatic cross section illustrated here shows a hollow auger shaft in which the drive is accommodated, which drive comprises a motor and an optional transmission. In addition, the power supply is provided in the form of a battery 18. It should be noted that the power supply in all such embodiments may in addition also be provided externally, at least in order to recharge the batteries, but advantageously also to mix and cut which, after all, requires more power than unloading. The vehicle illustrated here is an autonomous vehicle, and comprises a control unit (not shown here).

The auger shaft 8 in this case comprises an auger body 10 in the form of a spiral or screw thread to which two long blades 11 and four short blades 12 are attached. At the bottom, a scraper part 16 is indicated which will be explained in more detail below.

In this embodiment, in which the auger shaft 8 is attached to the drive 17 by means of the coupling piece 19, two long blades 11 are fitted to the auger body 10. One of these is the top blade and the second long blade 11 is situated slightly over halfway up the auger shaft. Of the four short blades 12, two are situated between the two long blades 11 and two underneath the bottom long blade 11. These and other arrangements are possible according to the advantages mentioned in the introduction to the description. It should be noted that all of the blades are in a substantially horizontal position. This can be achieved by making them narrow and positioning them radially, but this has the drawback that they are relatively fragile. In a sturdier embodiment, the blades are wider and will be slanting slightly without requiring special measures, due to the fact that they follow the curvature of the auger body 10. If a horizontal position is desired, then this can be achieved by a curved attachment part of the blades which compensates for the curvature of the auger body.

FIG. 3 diagrammatically shows a top view of a feed auger according to an embodiment of the invention.

In this case, two long blades 11 are likewise fitted to the auger body 10 which has a widening auger body part 10'. In addition, three short blades 12 are visible, as well as an embodiment of a bottom part of the feed auger, comprising an end radius 20, a face portion 21, an upright edge face 22 and a bottom front edge 23. Furthermore, reference numeral 24 denotes a scraper face portion, reference numeral 25 a scraper edge portion and reference numeral 26 a scraper front edge.

The visible blades are distributed more or less evenly over the auger body 10. In this case, it is for example possible to take into account an even load on the auger body 10.

Furthermore, it can be seen that the auger body 10 widens towards the bottom and blends into a widening auger body part 10'. The widening auger body part 10' and the auger body 10 as such form a helical unit, the auger threaded body. The truly helical part finishes at the end radius 20 and there blends into a horizontally extending face portion 21 which forms an arcuate segment around the auger shaft 8. The face portion 21 in turn ends in an obliquely upright edge face 22 with a bottom front edge 23. The bottom front edge 23 also extends in an arch shape, in which case it is able to pick up feed when the feed auger is rotated in the intended direction of rotation, that is to say in this case clockwise, and gradually fling it onto the auger body 10 which is gradually performing a throwing-up movement. Due to the fact that the bottom front edge 23 is curved and extends radially outwards, viewed in the intended direction of movement, the feed in the container will gradually be thrown up. In addition, the bottom front edge 23 and the upright edge face 22 perform a scraping function on the bottom of the container. This scraping function is also performed by the second scraper, in this case arranged as a scraper face portion 24 and fitted to the auger shaft 8, and ending in a scraper edge part 25 which likewise stands at an angle and has a front scraper front edge 26. Said scraper edge is arranged substantially diametrically opposite the bottom front edge 23 in order to achieve an even scraping and throwing-up behaviour. The second scraper may be supplemented by even more scrapers, but this is also optional.

The exemplary embodiments illustrated here are non-limiting examples. The scope of protection of the invention is also determined by the attached claims.

The invention claimed is:

1. A feed-mixing wagon for mixing and unloading animal feed, and comprising:
    a frame with a drive,
    a container which is arranged on the frame and is open at a top, with a bottom and a continuous wall arranged thereon and a closable feed-unload opening in the wall,
    at least one feed auger which is arranged in the container and is rotatably drivable in a direction of rotation about a substantially vertical axis of rotation, the at least one feed auger arranged to at least mix animal feed which has been introduced into the container and comprising an auger shaft and an auger body which extends continuously around the auger shaft, the auger body including, a helical upper part which is arranged around the auger shaft in a spiral and a horizontally extending face portion which extends from a bottom end radius of the helical upper part, the face portion comprising, when viewed in the direction of rotation, a bottom front edge which is situated closest to the bottom during rotation of the feed auger and extends in a horizontal plane,
    wherein a greatest chord of the bottom front edge extends along the bottom front edge between two ends of the bottom front edge, the greatest chord extends through the auger body when viewed in the direction of rotation, and
    wherein a line through said chord extends, viewed in the direction of rotation, in front of the axis of rotation.

2. The feed-mixing wagon according to claim 1, wherein the feed auger comprises a transition which extends around the auger shaft, between the bottom front edge and the auger body, the transition of which comprises an edge face which stands at an oblique angle with the horizontal plane as well as an adjacent horizontal face portion which extends between the edge face and an end radius of the auger body which is arranged as an auger helix body.

3. The feed-mixing wagon according to claim 1, wherein the auger body which is arranged around the auger shaft in a spiral has an outer edge, on which outer edge a plurality of blades are provided,
    wherein the blades comprise at least one long blade and at least one short blade, and wherein the at least one short blade is situated closer to the bottom end than the at least one long blade.

4. The feed-mixing wagon according to claim 3, wherein the at least one long blade is provided as a top blade on the outer edge.

5. The feed-mixing wagon according to claim 3, wherein exactly two long blades are provided on the outer edge.

6. The feed-mixing wagon according to claim 5, wherein one of the two long blades is provided substantially halfway up the feed auger.

7. The feed-mixing wagon according to claim 3, wherein at least as many short blades are provided on the outer edge as long blades.

8. The feed-mixing wagon according to claim 7, wherein a first number of the short blades are provided below a bottom long blade, and a second number of the short blades are provided above the bottom long blade, wherein the first number is equal to the second number.

9. The feed-mixing wagon according to claim 8, wherein the first number is larger than the second number.

10. The feed-mixing wagon according to claim 3, wherein the blades, viewed in vertical projection on the feed auger, are distributed substantially evenly over an outer periphery of the feed auger.

11. The feed-mixing wagon according to claim 10, wherein at least the long blades, viewed in vertical projection on the feed auger, are distributed substantially evenly over the outer periphery of the feed auger.

12. The feed-mixing wagon according to claim 3, wherein more short blades are provided on the outer edge than long blades.

13. The feed-mixing wagon according to claim 1, further comprising a motor arranged on the frame to rotatably drive the feed auger.

14. The feed-mixing wagon according to claim 1, wherein the bottom front edge is continuously curved with a local radius of curvature directed radially towards the auger body.

15. The feed-mixing wagon according to claim 1, wherein the drive of the frame comprises a motor, and wherein the feed-mixing wagon is an autonomous feed-mixing wagon.

16. The feed-mixing wagon according to claim 1, wherein the auger body includes a widening auger body part that transitions to the bottom front edge.

17. The feed-mixing wagon according to claim 1, wherein the axis of rotation is perpendicular to the horizontal plane.

18. A feed-mixing wagon for mixing and unloading animal feed, and comprising:
- a frame with a drive,
- a container which is arranged on the frame and is open at a top, with a bottom and a continuous wall arranged thereon and a closable feed-unload opening in the wall,
- at least one feed auger which is arranged in the container and is rotatably drivable in a direction of rotation about a substantially vertical axis of rotation, the at least one feed auger arranged to at least mix animal feed which has been introduced into the container and comprising an auger shaft and an auger body which extends continuously around the auger shaft, the auger body including a helical upper part which is arranged around the auger shaft in a spiral and a horizontally extending face portion which extends from a bottom end radius of the helical upper part, the face portion comprising, when viewed in the direction of rotation, a bottom front edge which is situated closest to the bottom during rotation of the feed auger and extends in a horizontal plane, wherein the bottom front edge is curved continuously;

wherein a greatest chord of the bottom front edge extends along the bottom front edge between two ends of the bottom front edge, the greatest chord extends through the auger body when viewed in the direction of rotation, and wherein a line through said chord extends, viewed in the direction of rotation, in front of the axis of rotation.

19. The feed-mixing wagon according to claim 18, wherein the auger body includes a widening auger body part that transitions to the bottom front edge.

20. The feed-mixing wagon according to claim 18, wherein the axis of rotation is perpendicular to the horizontal plane.

* * * * *